(No Model.) 4 Sheets—Sheet 1.
A. W. BILLINGS.
APPARATUS FOR MANUFACTURING BEER OR ALE.
No. 580,104. Patented Apr. 6, 1897.
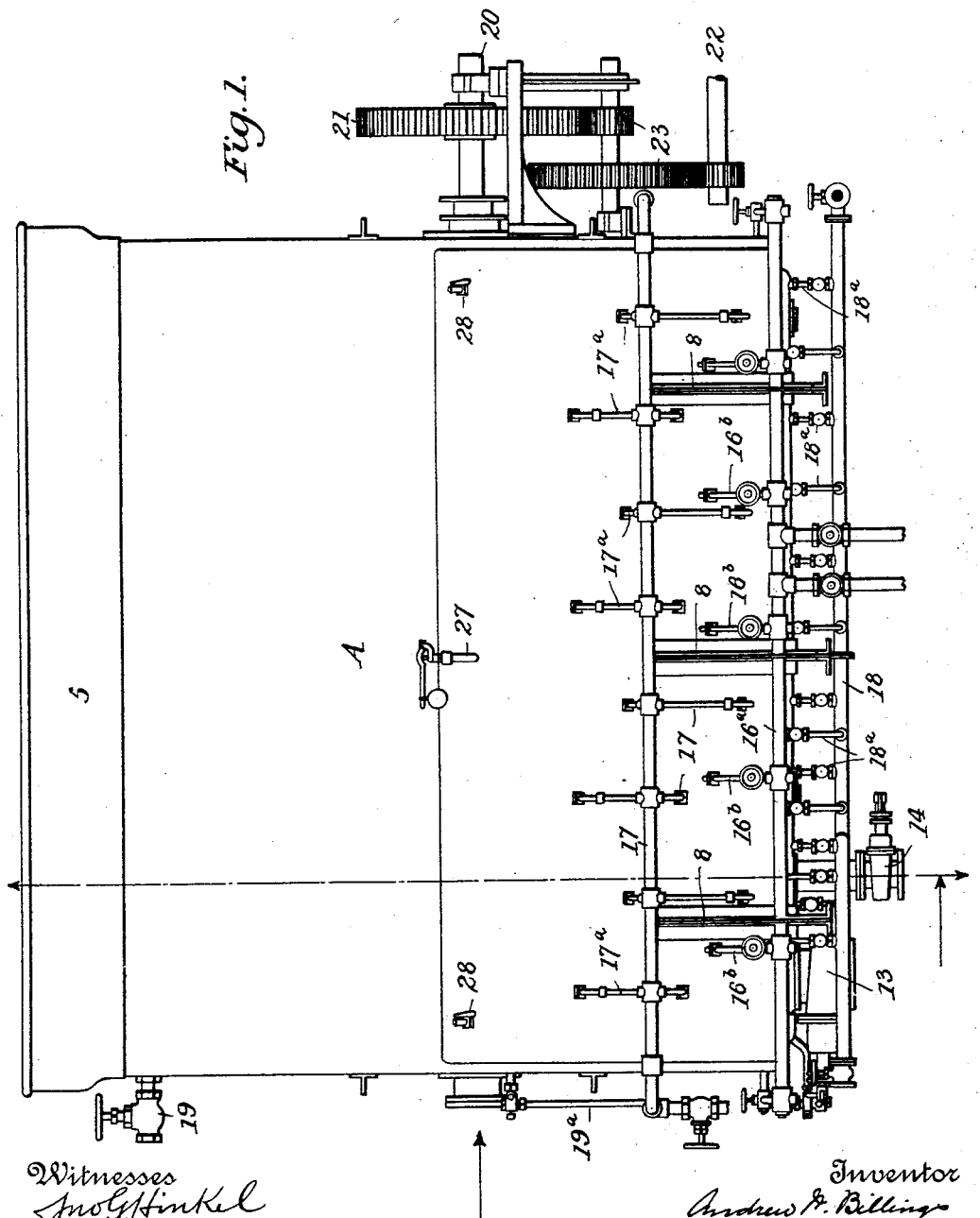

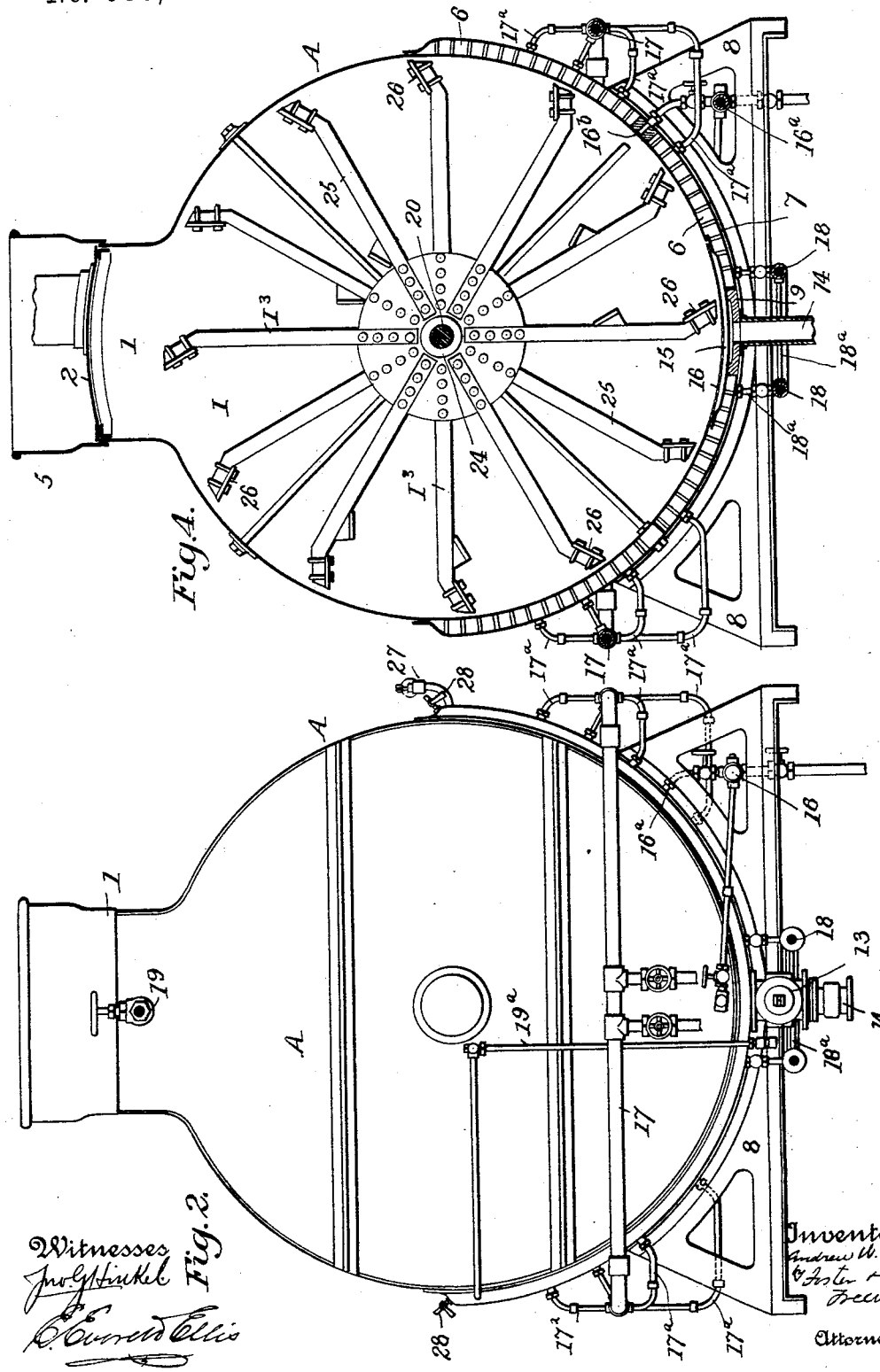

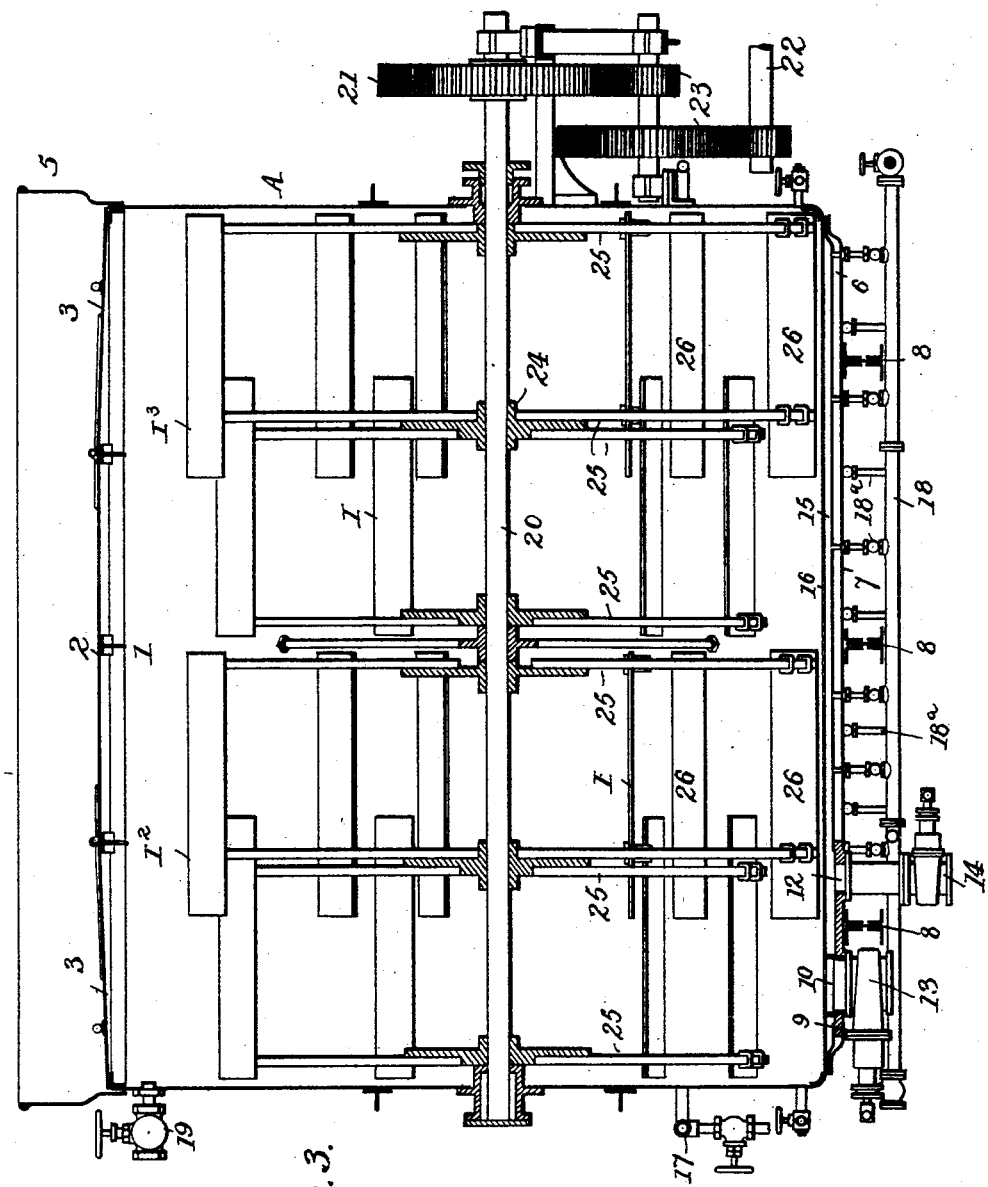

(No Model.) 4 Sheets—Sheet 4.

A. W. BILLINGS.
APPARATUS FOR MANUFACTURING BEER OR ALE.

No. 580,104. Patented Apr. 6, 1897.

United States Patent Office.

ANDREW WORTHINGTON BILLINGS, OF LONDON, ENGLAND.

APPARATUS FOR MANUFACTURING BEER OR ALE.

SPECIFICATION forming part of Letters Patent No. 580,104, dated April 6, 1897.

Application filed October 9, 1895. Serial No. 565,146. (No model.)

*To all whom it may concern:*

Be it known that I, ANDREW WORTHINGTON BILLINGS, a citizen of the United States, residing in London, England, have invented a certain new and useful Improvement in Apparatus for the Manufacture of Beer or Ale, of which the following is a specification.

This invention relates to apparatus for the manufacture of beer, ale, and other malt liquors.

It is the object of the invention to provide an apparatus by the use of which malt liquors may be manufactured in a simpler, quicker, and less expensive manner than heretofore and to effect the aeration of wort in the same apparatus in which the mashing and boiling take place.

A further object of the invention is to insure the perfect sterilization of the air used in the aeration of the wort and to regulate the flow of such air in the manner hereinafter more particularly pointed out.

Figure 5:
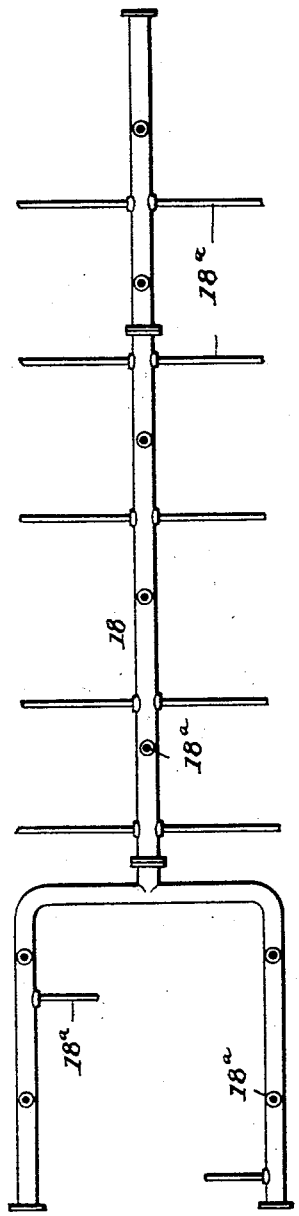
Figure 6:
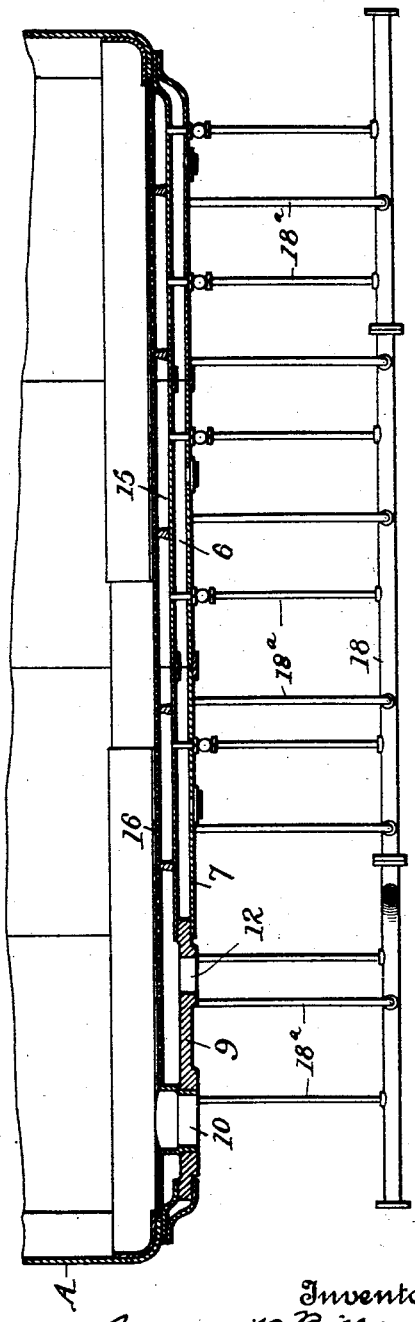

In the accompanying drawings, forming a part of this specification and in which like letters and numerals of reference indicate corresponding parts, Figure 1 is a side elevation of a converter. Fig. 2 is an end elevation. Fig. 3 is a longitudinal sectional view of the converter. Fig. 4 is a transverse sectional view. Fig. 5 is a plan view of the aerating-pipes, and Fig. 6 is an enlarged sectional view showing the strainer-plate and the discharge-ports.

Although the beneficial effect of aerating wort is recognized and its necessity acknowledged, the precise nature of its effect is not as yet thoroughly understood.

In those processes of manufacturing malt liquors now in vogue the aeration of wort is either effected while it is being pumped from the hop-back or after it has become cooled and is being passed to the fermenting-tuns, or while it is in said tuns undergoing fermentation, but it has never to my knowledge been aerated during or immediately after the process of boiling in the same vessel.

The aeration of wort has not been accomplished heretofore without experiencing difficulties, among the greatest of which have been to sterilize or free the air used in aerating the wort from germs and to regulate the flow of such air. Difficulty has also been experienced in aerating wort while in a state of ebullition, owing to the lack of adaptability of the ordinary brewers' copper for this purpose.

Briefly stated, my process consists in introducing raw grain, preferably ground or crushed, or hops into a converting apparatus, where it is formed into mash, which is afterward filtered and the fluid or wort obtained therefrom returned to the converting vessel and boiled in the usual manner, during or immediately after which it is aerated and cooled at the same time by forcing streams of air, which has been thoroughly sterilized, through the same.

Referring to the drawings, which illustrate the preferred form of apparatus for carrying my process into effect, A represents the casing, formed, preferably, of boiler-steel. This casing is substantially cylindrical in form and is provided at its top with a neck 1, Fig. 4, which extends throughout the length of the casing. The neck is closed by means of a cover 2, provided with doors 3, Fig. 3, which afford access to the interior of the casing. The neck 1 is surrounded by an apron 5, which forms a supplementary chamber on top of the casing A, said chamber being open at its upper end.

The doors 3 are adapted to fit tightly within the cover, in order to render the interior chamber of the casing A steam-tight, and to this end any suitable packing may be interposed between the doors and cover, and devices for securing the doors to the cover may be employed in addition.

A steam and water chamber 6, Fig. 4, is formed around the lower half of the casing by means of a steam-jacket 7 in the form of a shell, and the jacketed casing rests upon a number of cradles or supports 8.

In order to avoid all possibility of leaking around the discharge-openings, the casing A is provided in its bottom, near one end, with a curved block 9, Fig. 3, of a thickness corresponding to the space between the jacket 7 and casing A, between which it is interposed.

Located within the casing and elevated above the bottom thereof to form a chamber 15, which extends through the entire length of the casing, is a perforated plate 16.

The block 9 is formed with two discharge-openings 10 12, communicating with valve-controlled outlet-pipes 13 14. The larger discharge-opening 10 communicates directly with the interior chamber of the casing A, while the smaller opening 12 communicates with the chamber 15, the purpose of which will presently appear.

A steam and water pipe 16ª, Figs. 1 and 4, leading from any suitable source of supply, communicates through branch valve-controlled pipes 16ᵇ with the interior of the casing. This pipe, as shown, is arranged at one side of the casing A, but it may, if desired, be arranged on both sides thereof.

Surrounding the casing A is another steam and water pipe 17, which communicates with the steam and water chamber 6 through branches 17ª and is adapted to supply steam and water thereto.

Arranged below the casing and communicating with the chamber 15 by means of branch pipes 18ª is a pipe 18, through which air is supplied to said chamber and, through the strainer-plate 16, to the interior chamber of the casing. A sparge-pipe 19 communicates with the interior chamber of the casing A and at one end of said casing is a water-gage 19ª.

I prefer to arrange the air, water, and steam supply pipes as shown, but they may be arranged in any suitable manner to meet varying conditions.

The interior chamber of the casing A is provided with stirrers I, which may be in one, two, or more sections. As shown, there are two sections I²I³, supported upon and turning with a shaft 20, which extends centrally through the casing and is projected beyond one end thereof for reception of a gear 21, to which motion is imparted from a power-shaft 22 through intermediate gears 23.

Each of the stirrer-sections consists of a hub 24, from which project radial arms 25, which support blades 26 at their outer ends.

The steam-chamber 6 communicates with a safety-valve 27, Fig. 1, which is adapted to open when the pressure of steam in said chamber becomes too great. Cocks 28, also communicating with chamber 6, permit the escape of air therefrom.

In carrying my process into effect with the apparatus above described a mash consisting of raw grain and malt is made in the interior of the casing A and is discharged through the opening 10 and outlet-pipe 13 to a suitable filtering apparatus, (not shown,) which filters the wort. Previous to the formation of the mash, however, the strainer-plate 16 is removed from the casing A, as its presence therein during the converting operation would allow the grain to pack below the same and bake.

After the removal of the mash from the casing the stirrers I and casing are thoroughly cleansed by injecting water into the casing through the pipes 16ª and 16ᵇ and sparge-pipe 19. The strainer-plate 16 is then replaced within the casing and the filtered wort pumped back into the interior chamber of the casing A. Hops are then added to the wort, which is then subjected to the usual boiling operation by the admission of steam to the chamber 6 through the pipes 17ª. After the wort has been boiled for the required length of time the steam flowing to the chamber 6 is shut off and cold water or air is supplied to the chamber through the pipes 17ª, through which the steam was supplied. The admission of cold water or air to the chamber 6 serves to cool the wort contained in the casing, and simultaneously or immediately after the cooling operation commences the wort is aerated by forcing cool air through the pipes 18ª, the air being divided into fine streams by the strainer-plate 16 and dispersed through the wort by the revolution of the stirrers I. The air which is forced through the wort is previously sterilized to free it of the presence of all germs, and I prefer to effect the sterilization of the air by forcing it through cotton or wool saturated with glycerin, &c. From the above it will be noted that the aerating and cooling of the wort take place at the same time.

Upon the completion of the cooling and aeration of the wort it is clarified and then drawn off through the discharge-opening 12, Fig. 3, and conveyed to the fermenting-receptacles and pipe 14, the hops, sediment, and albumen being separated therefrom by the strainer-plate 16. The hops are then discharged through the discharge-opening 10 and pipe 13 and the interior of the casing thoroughly cleansed by injecting water therein preparatory to repeating the converting operation.

It often happens in practice that the space or chamber under the strainer-plate 16 becomes obstructed by the resinous matter of the hops and with other matter present in the wort, and in order to overcome this without necessitating the removal of the strainer-plate the pipe 18 is disconnected from its source of air-supply and connected with a source of steam or water supply which is forced through pipes 18ª into the chamber beneath the strainer-plate 16 and carries the sediment with it through the discharge-opening 12, Fig. 6.

Having thus fully described the process and the apparatus for carrying it into effect, what I claim is—

1. An apparatus for the manufacture of beer or ale, comprising a casing, a strainer-plate within the casing, a chamber below the same, discharge-pipes communicating with said chamber and with the interior of the casing respectively and supply-pipes communicating with the chamber and with the interior of the casing respectively, substantially as described.

2. An apparatus for the manufacture of beer or ale, comprising a casing, a strainer-plate within the casing, a chamber below the same, and discharge-pipes communicating with said chamber and with the interior of the casing respectively, substantially as described.

3. An apparatus for the manufacture of beer, comprising a casing, a steam and water chamber partially surrounding the same, a strainer-plate in the casing, a chamber below the same, valve-controlled discharge-openings communicating with the chamber below the strainer-plate and with the interior of the casing, respectively, and valve-controlled supply-pipes communicating with the interior of the casing, the chamber beneath the strainer-plate and with the steam and water chamber, respectively, substantially as described.

4. An apparatus for the manufacture of beer, comprising a cylindrical casing, a steam and water chamber partially surrounding the same, a perforated strainer-plate in the bottom of the casing, a chamber below the same, discharge-openings from the interior of the casing, and the chamber below the strainer-plate respectively, water-supply pipes leading to the interior of the casing, independent pipes for conveying air thereto, and supply-pipes communicating with the steam and water chamber, substantially as described.

In testimony whereof I have hereunto set my hand in the presence of two subscribing witnesses.

ANDREW WORTHINGTON BILLINGS.

Witnesses:
PHILIP M. JUSTICE,
ALLEN PARRY JONES.